3,312,702
6-MERCAPTOPURINE 3-N-OXIDE
George B. Brown, Mamaroneck, N.Y., and Gershon Levin, London, England, assignors to the United States of America as represented by the United States Atomic Energy Commission
No Drawing. Filed Oct. 19, 1964, Ser. No. 404,991
3 Claims. (Cl. 260—252)

The invention described herein may be manufactured and used by or for the government of the United States of America for governmental purposes without the payment of any royalties thereon or therefor.

The present invention relates to 6-mercaptopurine-3-N-oxide and the method of preparing the same.

6-mercaptopurine has been shown to have valuable pharmaceutical properties in the control of neoplastic growth in animals and in the production of remissions in human leukamias. However, 6-mercaptopurine is highly toxic and the amount of dosage that can be tolerated by patients is sharply limited.

We have discovered that 6-mercaptopurine-3-N-oxide (purine-6-thiol 3-N-oxide) can readily be prepared by introducing the N-oxide function while the sulfur is protected from oxidation in a thiazole.

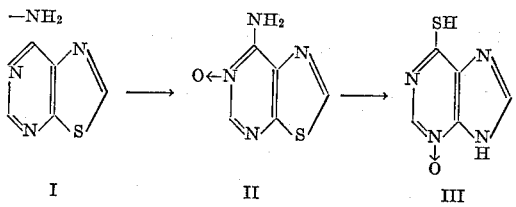

The nitrogen of I is oxidized to the N-oxide with peroxyacetic acid, obtained by mixing hydrogen peroxide and glacial acetic acid. With more concentrated solutions and in larger batches, the oxidation has been accomplished in two days, rather than in three weeks, but the exothermic nature of the reaction necessitates cooling and the yields are somewhat lower. The oxidation of many small batches is preferable.

The arrangement of this 7-aminothiazolopyrimidine-6-N-oxide, II, to the 6-mercaptopurine-3-N-oxide, III, involves the opening of the thiazole ring and reclosure with the amino function to result in an imidazole derivative. That rearrangement has been carried out with various quantities of sodium hydroxide in water or alcohols at temperatures to 100°. Better yields and a purer product are obtained at more moderate temperatures.

The dosage of the 6-mercaptopurine-3-N-oxide of this invention that could safely be administered intraperitoneally into a mammal is much greater than the permissable dosage for 6-mercaptopurine. The 6-mercaptopurine-3-N-oxide exerts biologic effects similar to those obtained with 6-mercaptopurine but at doses approximately tenfold greater. When administered by the intraperitoneal route 6-mercaptopurine-3-N-oxide at 1000 mg./kg. of body wt./day for one week resulted in 100 percent mortality in mice bearing very small tumors, whereas, 500 mg./kg. of body wt./day was well tolerated by the host. In contrast, 6-mercaptopurine was lethal to the host at 100 mg./kg. of body wt./day but was tolerated at 50 mg./kg. of body wt./day.

The following example is given to illustrate the practice of our invention:

7-aminothiazolo [5,4-d] pyrimidine 6-N-oxide.—A suspension of 50 g. of 7-aminothiazolo [5,4-d] pyrimidine in 100 ml. of glacial acetic acid in a 500 ml. beaker was stirred with a rod and 50 ml. of 30 percent aqueous hydrogen peroxide solution was added. The beaker was covered with a watch glass. Much of the starting material dissolved in a few hours and as the N-oxide began to precipitate the suspension became yellow. The evolution of oxygen stirred the solution gently and resulted in the accumulation of solids up the sides of the beaker. After one week an additional 25 ml. of 30 percent hydrogen peroxide was stirred in. After 3 weeks (20) the product was collected in a large sintered-glass Buchner funnel and was washed by suspension in 200 ml. of water. The unreacted 7-aminothiazolpyrimidine was largely separated from the N-oxide by washing the mixture by suspension, on the funnel, in 200 ml. of warm tetrahydrofuran. Complete removal of the starting material was accomplished by further extraction of the solids with tetrahydrofuran in a Soxhlet extractor overnight. The solids were again suspended, on a funnel, in 100 ml. of water which removed traces of an unidentified material, the $R_f$s of which are given in the table.

The air-dried product, slightly yellow, 45 gm., 80–82 percent yield (90 percent on unrecovered starting material), darkening with dec. from 235°, was used in the next step.

A sample was recrystallized from water, with charcoal, to yield white plates, M.P. ca. 278° dec. (capillary) when placed in the bath at 260 to 270°.

Analysis.—Calcd. for $C_5H_4N_4OS$: C, 35.71; H, 2.37; N, 33.33; S, 19.05. Found: C, 35.94; H, 2.48; N, 33.50; S, 19.04.

The tetrahydrofuran extracts were cooled and approximately 5 g. of the starting material was recovered for addition to subsequent batches.

Ten or twenty batches of the oxidation mixture have been run simultaneously in a hood with a surrounding temperature of 22°, and with a temperature rise in the beakers of 3 to 4°. Ten or more batches were then combined in a 24 cm. Buchner funnel for collection and washing.

6 - mercaptopurine 3 - N - oxide.—A suspension of 50 grams of 7-aminothiazolo [5,4-d] pyrimidine-6-N-oxide in 1.0 liter of methanol was heated to 60° C. under an atmosphere of nitrogen in a three-necked flask. The flask was wrapped in aluminum foil to exclude excessive light. 600 ml. of 1.0 N NaOH was then added dropwise over a period of one hour to the mixture in the flask, while the mixture was stirred. After maintaining the temperature of the mixture at 60° C. for 22 hours, a small amount of powdered charcoal was added to the mixture and then the solution was filtered while warm to remove traces of solids.

500 ml. of 10 percent (by weight) of acetic acid was added to the warm filtered solution and the solution was allowed to cool in the dark and a yellow crystalline product was collected by filtration from the mixture and washed by suspension in water and alcohol. The yield was 21 grams, 42 percent, of a product which contained no more than traces of 6-mercaptopurine by chromatographic assay.

This product was dissolved in about 130 ml. of 1.0 N NaOH; and 0.5 grams of charcoal was added. The solution was filtered and acidified with 10 percent acetic acid. 20.0 grams of yellow to tan product was collected having a M.P. 230° dec., which was washed in alcohol and water, thereafter dried in vacuo at 40° C. and stored in dark bottles to avoid deterioration. This product was analytically determined to be a pure monohydrate of 6-mercaptopurine 3-N-oxide entirely free of 6-mercaptopurine. Drying at 100° C. results in incomplete removal of the water of hydration and in significant decomposition.

What is claimed is:

1. The method of producing 6-mercaptopurine 3-N-oxide comprising the steps of:

(a) reacting 7-aminothiazolo [5,4-d] pyrimidine with hydrogen peroxide to produce 7-aminothiazolo [5,4-d] pyrimidine-6-N-oxide;

(b) reacting 7-aminothiazolo [5,4-d] pyrimidine-6-N-oxide with an alkali hydroxide while maintaining the temperature of the reactants at about 60° C. to rearrange the 7-aminothiazolo [5,4-d] pyrimidine-6-N-oxide to produce 6-mercaptopurine 3-N-oxide.

2. 7-aminothiazolo [5,4-d] pyrimidine-6-N-oxide.
3. 6-mercaptopurine 3-N-oxide.

No references cited.

ALEX MAZEL, *Primary Examiner.*
NICHOLAS S. RIZZO, *Examiner.*
MARY U. O'BRIEN, *Assistant Examiner.*